Feb. 5, 1929.

F. W. DE JAHN 1,701,478

METHOD OF PRODUCING AMMONIA BY SYNTHESIS OF ITS ELEMENTS

Filed Feb. 18, 1926    2 Sheets-Sheet 1

INVENTOR
FREDRIK W. DE JAHN
BY
ATTORNEYS

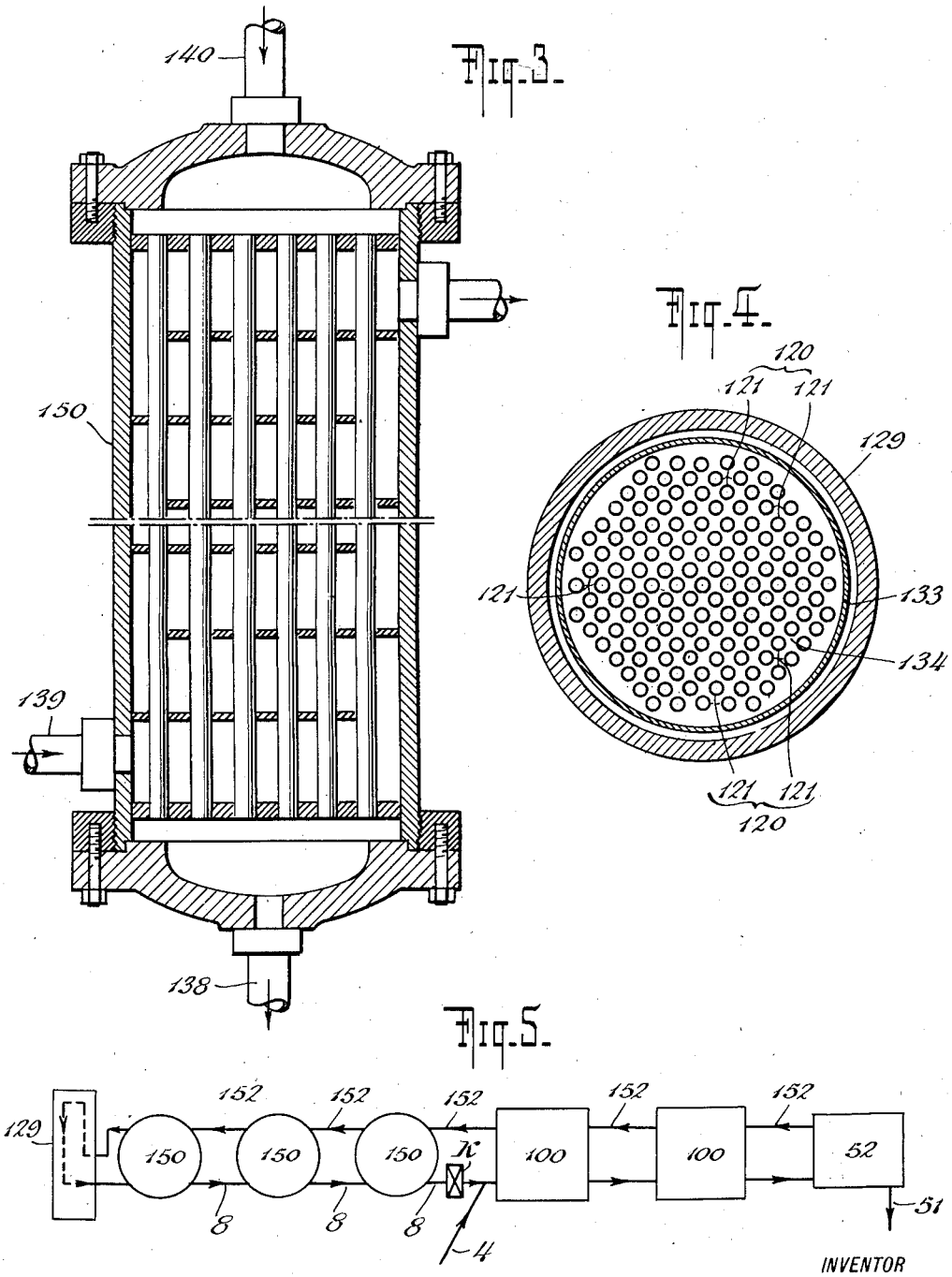

Patented Feb. 5, 1929.

1,701,478

UNITED STATES PATENT OFFICE.

FREDRIK W. DE JAHN, OF NEW YORK, N. Y., ASSIGNOR TO ATMOSPHERIC NITROGEN CORPORATION, OF SOLVAY, NEW YORK, A CORPORATION OF NEW YORK.

METHOD OF PRODUCING AMMONIA BY SYNTHESIS OF ITS ELEMENTS.

Application filed February 18, 1926. Serial No. 89,062.

The invention relates to improvements in processes involving the production of ammonia by the combination of hydrogen and nitrogen under the combined effect of a suitable catalyst, of appropriate temperature and of pressures materially above atmospheric.

The object of the invention is to assure proper temperature conditions and temperature control especially as between the catalytic material and the gases to be affected thereby.

A method for the production of synthetic ammonia in connection with which the present improvement is capable of beneficial use is shown in my United States patent application, Serial No. 471,158, filed May 20, 1921, as a renewal of my application, Serial No. 387,509, filed June 8, 1920, as a renewal of my orginal application, Serial No. 200,047, filed November 3, 1917, of which said application the present application is a continuation in part.

Figure 1:
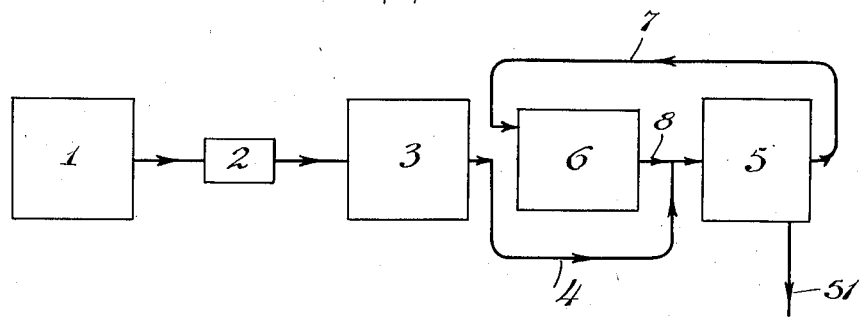
Figure 2:
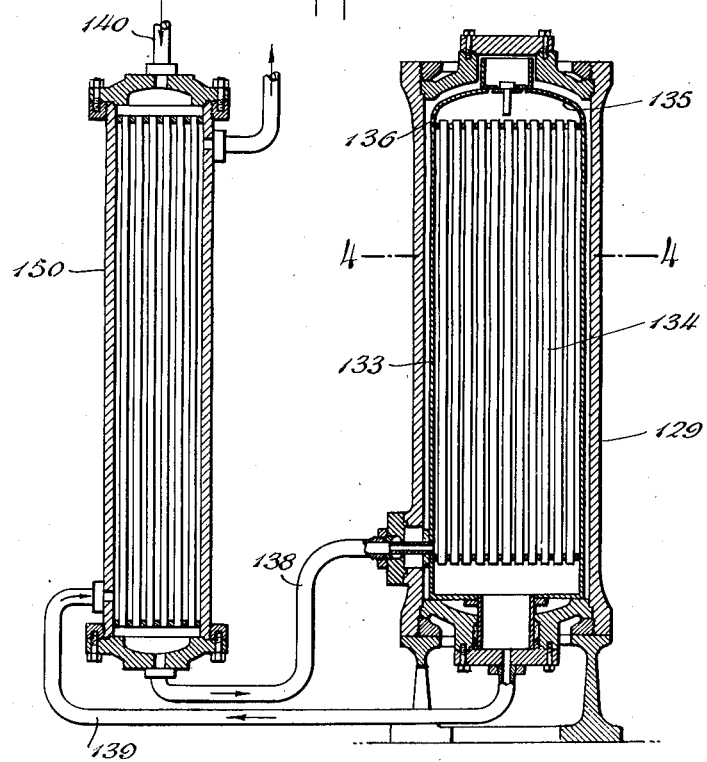

In the drawings Fig. 1 represents diagrammatically the synthetic ammonia process as a whole. Fig. 2 represents a vertical section of an apparatus such as may be employed at the particular part of the general process to which this invention relates. Fig. 3 is a detail illustrating the internal structure of a heat exchanger such as shown in Fig. 2. Fig. 4 is a section on the line 4—4 of Fig. 2. Fig. 5 is a diagrammatic view showing the course of the gases in the part of the system to which the appartus shown in Fig. 2 relates. In these drawings (Fig. 1) the numeral 1 represents the stage which is concerned with the production of a crude gas which contains three volumes of hydrogen to each volume of nitrogen. The numeral 2 indicates a compressor which is adapted to subject the crude gas mixture to a pressure of approximately 100 atmospheres. The numeral 3 indicates the purification system, wherein the gas mixture is purified while under pressure of the compressor 2. The numeral 4 indicates the line through which the gases from 3 pass into the refrigerating and ammonia liquefaction system 5, having a product outlet 51. The numeral 6 indicates the ammonia catalyst system having a return connection 7 through which the gas, after contact with the catalytic material in 6, and after traverse of the ammonia recovery system 5, is returned to the catalyst. The entire system 3, 4, 5, 6, and 7 is under the pressure of the compressor 2. It is at the point numbered 6 in Fig. 1 that the invention of the present application is particularly applicable. It is the system shown at 6, Fig. 1, which is the subject of more detailed illustration in Figs. 2, 3, and 4.

The course of the gases through the entire system from No. 1 on may, of course, be that indicated in the patent application of which the present application is in part a continuation, but the preferred method of conducting the procedure is that illustrated in Fig. 1 of the present application, said procedure being more fully and at length described in my pending patent application, Serial No. 638,451, filed by me on May 12, 1923.

In order to show the general circulation of the gases through the system 5—6 of Fig. 1, reference is made to Fig. 5 of the drawings. In that figure the gases flowing through the line 4 pass through the cold exchangers 100, thence into the ammonia liquefier 52 from which the ammonia recovered is withdrawn through outlet 51. From the ammonia liquefier 52 the gases not affected by the liquefaction flow in a reverse direction through the line 152 through the cold exchangers 100 travelling therein in heat-exchange relation with the gases entering through 4 and 8. After passing the last of the cold exchangers 100, the gases from the ammonia liquefier proceed through heat exchangers 150 and then through and finally in contact with the catalyst in the converter 129. The gas mixture leaving the converter 129 passes through the heat exchangers 150 in heat-exchange relation with the cooler gases travelling in the reverse direction and then into the cold exchangers 100. A circulating pump K is located preferably in the cooler part of the system, for example, on line 8 between the hot exchangers 150 and the cold exchangers 100. It will be seen that according to this procedure the gases entering the converter 129, that is the incoming gases, pass in heat-exchange contiguity to the hot gases of the reaction which has taken place in the converter 129, this being the function of the heat exchangers 150 which are illustrated more in detail in Figs. 2 and 3. As the result of the use of these heat exchangers 150, it is apparent that the gases on their way to the converter 129 are heated in 150 to a temperature still below that required for the reaction, so that the gases still require an elevation of temperature to bring them to substantially the temperature necessary for the reaction. This last elevation of temperature is brought about by passing the gases, preheated in 150, through and in unrestricted thermal contact with the catalytic material in the converter 129. The gases then, having acquired substantially the temperature necessary for the reaction, are passed into direct contact with the catalytic material.

Instead of arranging the course of the gases as shown in Fig. 5, the course may be that shown in Fig. 15 of Belgian Patent No. 278,858, either of the two figures, Fig. 5 of the present application, or Fig. 15 of the Belgian patent, functioning in the same way, so far as the subject matter of the present application is concerned.

Details of the course of the gases through one of the heat exchangers 150 and through the converter 129 are shown in Fig. 2 of the present application. In that figure 150 designates the pressure sustaining wall and heads of the heat exchanger. The gas mixture from previous heat exchangers of the same character as 150, enters the heat-exchanger 150 shown in the drawing through the line 140, and thence in heat-exchange relation with the hot gases entering the heat exchanger 150 through the connection 139. The preheated gases, after passing through 150, have now acquired a fairly high temperature, which is, however, still below the temperature required for the reaction. In this condition they pass through conduit 138, and enter the converter. The pressure sustaining wall of the converter in Fig. 2 is designated as 129. Within this pressure sustaining wall is a tube nest 134 adapted for the reception of catalytic material. In the specific embodiment of the invention shown in Fig. 2, the arrangement is such that the catalytic material is distributed throughout the cross-sectional extent of the converter by being placed within the tubes, although this arrangement may be reversed so that the catalytic material is distributed by being placed around the tubes, the tubes being left free for the passage of the entering gases. In either case the mass or body of the catalyst material is, as indicated in Fig. 4, repeatedly interrupted in continuity, transversely of the converter, by gas passages penetrating the body of catalytic material considered as a whole. These gas passages are, as shown, in unrestricted thermal contact with the catalytic material, the gas being spaced from the catalytic material by nothing except the metal walls of the tubes, the catalytic material being in contact with either the inner or the outer wall of the tubes, while the moving gases are in contact with the opposed wall of the tubes. It will also be seen that whether the catalytic material is located inside or outside the tubes, the effect in each case is the same, to wit, that of providing gas space distributed through the whole body or mass of catalytic material which gas space includes gas space located between the center of the catalyst chamber and the outermost parts of the catalytic material in the chamber. In Fig. 4 the general or aggregate gas space is designated as 120 and in that case this gas space 120 includes a plurality of gas spaces 121 which are in turn located between the center of the catalyst chamber and the outermost parts of the catalytic material which is present in said chamber. When the catalyst is located outside of the tubes, the aggregate gas space 120 will be represented by the sum of the gas spaces defined by the interior of the tubes and the space in each tube will then correspond in function and in its relation to the catalytic material, to the specific gas spaces 121 of Fig. 4.

It will thus be seen that the bounds of the gas space which extends through the body or mass of catalytic material, are constituted, when the tubes are filled with catalytic material, of the outer walls of the tubes and the inner wall of the shell, while, when the catalyst occupies the space between the tubes, the bounds of the gas space are constituted of the inner walls of the tubes. In either case the major portion of the bounds of the gas space is, as is evident from Fig. 4, in unrestricted thermal contact with the catalytic body.

The preheated gases entering the converter 129 through connection 138 pass upwardly through and in unrestricted thermal contact with the mass of catalytic material and are thereby preheated to substantially the temperature necessary for the reaction which occurs when the gases come in direct contact with the catalyst. The gases thus preheated enter the dome 135, reverse their direction, and enter into direct contact with the catalytic material having previously acquired substantially the temperature necessary for reaction. Reaction takes place in the catalytic material and causes evolution of heat which is in part transmitted to the incoming gas travelling in an opposite direction in unrestricted thermal contact with the catalytic material. The products of the reaction, as well as gases which have not reacted, but whose temperature is the same as that of the products of the reaction, leave the converter through line 139 and in heat exchanger 150 transmit a portion of their heat to the incoming gases from the heat exchanger 150 of Fig. 2. The exit gases, still retaining substantial heat, pass through other heat exchangers of the same character, until heat of the converter gases has been transmitted to the incoming gases sufficient to bring their temperature substantially to that necessary for reaction by the time these gases reach the catalyst.

The dome 135 of Fig. 2 is provided with apertures 136, so that a part of the gases entering the converter 129 will at all times be maintained between the pressure sustaining wall 129 and the catalytic material in the shell 133. This tends to protect the pressure sustaining wall of the reaction chamber against excessive temperature conditions such as otherwise might tend to act destructively upon the material constituting said pressure sustaining wall. In the embodiment of the invention illustrated in Fig. 2 there is a constant flow of the stream of synthesis gas along the inner wall of the shell 133 and between the outermost part of the catalyst body and said shell. The maintenance of a flowing stream of uncatalyzed synthesis gas along the wall of a shell within which the catalytic material is located, establishes a condition adverse to the free and ready transfer of heat in directions transverse to the direction of motion of the said stream. This feature thereby serves to limit the transfer of heat from the catalyst to the pressure-sustaining wall of the reaction chamber and is consequently in itself one means of protecting the pressure-sustaining wall against excessive or destructive temperature conditions. It is accordingly evident that during the progress of heating the gases to substantially the temperature necessary for reaction by passing them through the body of catalytic material into the upper part of the converter 129, and then into direct contact with the catalytic body, the pressure sustaining wall of the reaction chamber is constantly protected against excessive temperature conditions by the continuous maintenance of a part of the synthesis gas between said wall and the catalyst. Heretofore attempts have been made to preserve the pressure sustaining wall of the reaction chamber against excessive temperature conditions by exposing them to special gases differing from the gas mixture which is undergoing synthesis and I believe that I am the first, so far as I am aware, to use the synthesis gas itself, having the precise composition of the gas mixture which comes into direct contact with the catalyst, as a means for preserving and protecting the pressure sustaining wall and the reaction chamber against excessive temperature conditions, while at the same time causing the same character of synthesis gas to travel first through the catalytic material in unrestricted thermal contact and then through the catalytic material in direct or actual contact.

I claim:

1. A process of producing ammonia by synthesis of its elements under pressure in the presence of a catalytic body, which comprises passing incoming gases in heat-exchange contiguity to the hot gases of the reaction, and then heating the gases to substantially the temperature necessary for reaction by passing the preheated gases through and in unrestricted thermal contact with the catalytic body and thence at approximately their thus acquired temperature into direct contact with the said catalytic body.

2. A process of producing ammonia by synthesis of its elements under pressure in the presence of a catalytic body, which comprises preheating incoming gases by the heat evolved from the reaction and finally heating the said preheated gases to substantially the temperature necessary for reaction by passing them through and in unrestricted thermal contact with the interior of the catalytic body and then at approximately their thus acquired temperature into actual contact with the catalytic body.

3. A process of producing ammonia by synthesis of its elements under pressure in the presence of a catalytic body, which comprises passing incoming gases in heat-exchange contiguity to the hot gases of the reaction and then heating the gases to substantially the temperature necessary for the reaction by passing the preheated gases in unrestricted thermal contact with the catalytic body through a space which includes gas space located between the center of the catalyst chamber, and an outermost part of the catalytic material in said chamber and thence at approximately their thus acquired temperature into direct contact with said catalytic body.

4. A process of producing ammonia by synthesis of its elements under pressure in the presence of a catalytic body which comprises preheating incoming gases by the heat evolved from the reaction and finally heating the gases to substantially the temperature necessary for reaction by passing them in unrestricted thermal contact with the catalytic body through a space which includes gas space located between the center of the catalytic chamber and an outermost part of the catalytic material in said chamber and thence at approximately their thus acquired temperature into direct contact with said catalytic body.

5. A process of producing ammonia by synthesis of its elements under pressure in the presence of a catalytic body, which comprises passing incoming gases in heat-exchange contiguity to the hot gases of the reaction, and then heating the gases to substantially the temperature necessary for reaction by passing the preheated gases through and in unrestricted thermal contact with the catalytic body and thence into direct contact with the said catalytic body, and during the progress of the foregoing steps protecting the pressure sustaining wall of the reaction chamber against excessive temperature conditions by continuously maintaining a part of the synthesis gas between said wall and the catalyst.

6. A process of producing ammonia by synthesis of its elements under pressure in the presence of a catalytic body, which comprises passing incoming gases in heat-exchange contiguity to the hot gases of the reaction and then heating the gases to substantially the temperature necessary for the reaction by passing the preheated gases in unrestricted thermal contact with the catalytic body through a space which includes gas space located between the center of the catalyst chamber and an outermost part of the catalytic material in said chamber and thence into direct contact with said catalytic body, and during the progress of the foregoing steps protecting the pressure sustaining wall of the reaction chamber against excessive temperature conditions by continuously maintaining a part of the synthesis gas between said wall and the catalyst.

7. The process of producing ammonia by synthesis of its elements under pressure in the presence of a catalytic body which comprises passing incoming gases in heat-exchange contiguity to the hot gases of the reaction and then flowing the gases through a catalyst chamber in unrestricted thermal contact with the catalyst body in said chamber and thereby heating the gases to substantially the temperature necessary for reaction, then passing said gases into direct contact with the said catalytic body and during the progress of the foregoing steps protecting the pressure-sustaining wall of the reaction chamber against excessive temperature conditions by continuously maintaining a part of the synthesis gas between said wall and said catalyst chamber.

8. A process of producing ammonia by synthesis of its elements under pressure in the presence of a catalytic body, which comprises passing incoming gases in heat-exchange contiguity to the hot gases of the reaction to preheat the said incoming gases and then further heating the thus preheated gases to substantially the temperature necessary for reaction by passing them in heat-exchange relationship but not in direct contact with said catalytic body by way of a gas passage, a major portion of the bounds of which are in unrestricted thermal contact with said catalytic body and then passing the said gases at approximately their thus acquired temperature into direct contact with the catalyst.

9. A process of producing ammonia by synthesis of its elements under pressure in the presence of a catalytic body which comprises introducing the fresh gases into a chamber having a pressure-sustaining wall and into a region in proximity to a catalytic body used for effective synthesis, passing the gases within said region in unrestricted thermal contact, but out of direct contact, with the catalytic body until the said gases acquire substantially the temperature necessary for the synthesis, then flowing said preheated gases into direct contact with said catalytic body, and during the progress of the foregoing steps protecting the pressure-sustaining wall of the reaction chamber against excessive temperature conditions by continuously maintaining an atmosphere of the synthesis gas between said wall on the one hand and the said region on the other hand.

10. A process of producing ammonia by synthesis of its elements under pressure in the presence of a catalytic body, which comprises passing incoming gases in unrestricted thermal contact with the catalytic body through a space which includes gas space adjacent the outermost part of the catalytic body, said space being situated between said body and the pressure-sustaining wall, and protecting said wall against excessive heat transfer from the catalyst by continuously maintaining synthesis gas between said wall and said space adjacent the outermost part of said catalyst.

11. In the process of producing ammonia by synthesis of its elements under pressure in the presence of a catalytic body contained within a pressure vessel, that improvement which comprises protecting the pressure-sustaining wall of the vessel against excessive heat transfer from the catalyst by continuously maintaining an atmosphere of the synthesis gas between said wall and the catalytic body and by interposing a stream of the synthesis gas, on its way to the catalytic body, between said catalytic body and said atmosphere of synthesis gas.

12. In the process of producing ammonia by synthesis of its elements under pressure in the presence of a catalytic body contained within a pressure vessel, that improvement which comprises protecting the pressure-sustaining wall of the vessel against excessive heat transfer from the catalyst by continuously maintaining an atmosphere of synthesis gas between said wall and the catalytic body and by limiting the transfer of heat from the catalyst to said synthesis gas atmosphere by establishing between said catalytic body and said first mentioned atmosphere of synthesis gas, a condition adverse to free and ready transfer of heat.

13. A process of producing ammonia by synthesis of its elements under pressure in the presence of a catalytic body, which comprises passing the fresh gases through and in unrestricted thermal contact, but out of direct contact, with the catalytic body until the said gases acquire substantially the temperature necessary for the synthesis, and then flowing said preheated gases at approximately their thus acquired temperature into direct contact with said catalytic body.

14. The process of producing ammonia by synthesis of its elements under pressure in the presence of a catalytic body which comprises passing incoming gases in heat exchange contiguity to the hot gases of the reaction, then passing them through and in indirect but unrestricted thermal contact with the catalytic body, and then into direct contact with the catalytic body, the temperature sequence of the foregoing steps being such that the temperature of the incoming gases at the beginning of the heat exchange step first mentioned is lower than their temperature at the end of said heat exchange step, while the temperature of the gases at their point of first direct contact with the catalytic body is higher than the temperature of the gases at the end of the heat exchange treatment of the first mentioned step.

In testimony whereof I have hereunto set my hand.

FREDRIK W. DE JAHN.